May 12, 1931.  C. FERRO  1,805,083
LOCK FOR AUTOMOBILE TIRES, WHEELS, AND OTHER DEVICES
Filed Nov. 25, 1929   2 Sheets-Sheet 2

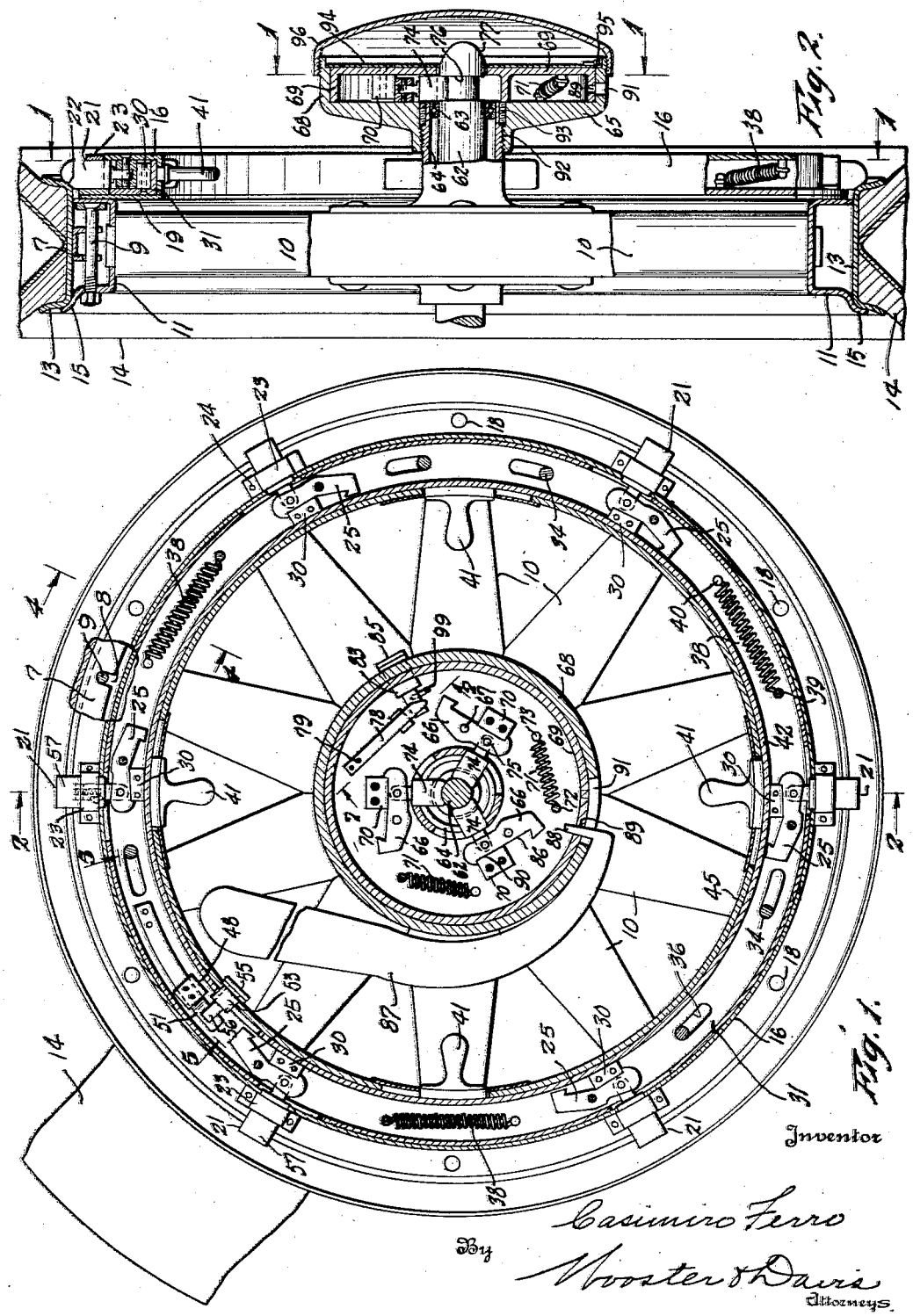

Inventor
Casimiro Ferro
By Wooster & Davis
Attorneys.

Patented May 12, 1931

1,805,083

UNITED STATES PATENT OFFICE

CASIMIRO FERRO, OF BAYONNE, NEW JERSEY

LOCK FOR AUTOMOBILE TIRES, WHEELS, AND OTHER DEVICES

Application filed November 25, 1929. Serial No. 409,593.

This invention relates to a securing and locking device for securing and locking together two separable elements, such for example as for securing and locking a tire and its rim to an automobile wheel, securing and locking the wheel to its axle, securing and locking a safe door, fire hose connections, or the hatch on a submarine, or similar devices, and altho I have shown it in the drawings as applied for securing and locking an automobile tire and rim to the wheel and for locking a wheel to its axle, this device is not limited to these uses. It may be used for securing and locking together other devices as indicated.

It is an object of this invention to provide a securing and locking means which will effectively secure the elements together and which may be quickly and easily released and as easily and quickly clamped.

It is another object of the invention to provide a securing and locking means for securing an automobile tire rim to its wheel or the wheel to its axle which is automatically released by merely turning a key-controlled lock, and in which the tire or wheel may be locked in place by the mere shifting of a manually operated device.

It is another object of the invention to provide a securing device for automobile tire rims in which the clamps automatically adjust themselves to compensate for variations in the wheel, rim, or elements of the locking device so that the rim is properly clamped under all conditions.

It is still another object of the invention to provide a device of this character which to provide a device of this character which is very simple in construction, will have an attractive appearance when applied to the wheel and in which all parts are effectively enclosed so as to be protected from moisture and dirt.

It is still another object of the invention to provide a device in which the tire and rim or the wheel can be removed and replaced in a minimum of time and with very little effort on the part of the operator.

With the foregoing and other objects in view, the invention consists in certain novel features of construction, combinations and arrangements of parts as will be more fully disclosed in connection with the accompanying drawings.

In these drawings:

Fig. 1 is a partial, side elevation and partial section of an automobile wheel showing my improved device applied thereto, the sections being substantially on lines 1—1 of Fig. 2.

Fig. 2 is a transverse section substantially on line 2—2 of Fig. 1, but showing certain elements in elevation.

Figure 3:
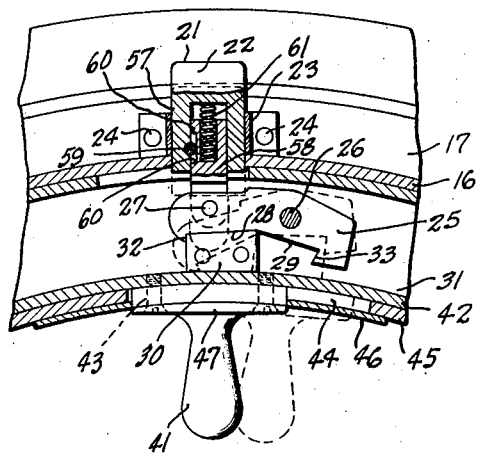
Fig. 3 is a detailed section on an enlarged scale of one of the clamping members and associated elements.

In the drawings is shown an automobile wheel which may be of any desired type, that illustrated being of the artillery type of wheel having spokes 10 and a felly 11 to receive the usual demountable rim 13 carrying the tire 14. This rim 13 is of the usual type of demountable rim and the felly 11 is the standard type of felly for receiving this rim and has a flange 15 on the inner side against which the rim rests when applied to the wheel and from which the rim may be slid outwardly to remove it from the wheel in the usual manner after it has been released.

My improved locking device for the rim is applied to the outer side of the wheel and is preferably secured to the outer side of the felly 11. It comprises an enclosing member 16 which has a flange 17 at the outer face of the felly and to which it is secured by any suitable means such as rivets or bolts 18. It is preferred that the body of this enclosing member be of substantially U shape in cross section as shown more clearly in Fig. 4 so that it is entirely enclosed on three sides and is open only on its rear side for insertion of the various operating elements. After these elements have been assembled the rear side may be closed by a plate 19 which is secured to the enclosing member by any suitable means such as screws 20 and the rivets or bolts 18. The casing or enclosing member 16 is, therefore, effectively closed to reduce to a minimum the entrance of moisture and dirt.

Figure 4:
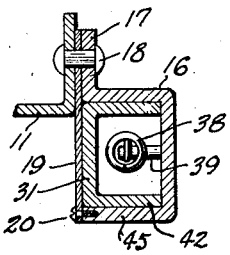
Fig. 4 is a transverse section substantially on line 4—4 of Fig. 1.

The rim 13 is secured and clamped on the felly by a plurality of securing elements of clamps 21, preferably equally spaced about the periphery of the wheel. There are six of these clamps shown on the drawings, but of course, the number may be varied as found desirable. Each of these securing elements is mounted to move radially toward and from clamping position against the outer side of the rim 13, and preferably have inclined cam surfaces 22 so that as these elements are forced outwardly they will tightly clamp the rim against the inner flange 15 of the felly. Each clamping element is guided for this radial movement and is firmly held by a suitable guide 23 which may be of any suitable type, but is preferably a substantially U-shaped strap embracing the securing element and secured to the flange 17 by bolts or rivets 24. Means are provided for simultaneously shifting all of these securing elements to and from the securing position so that they simultaneously clamp or release the tire rim. For this purpose, there is connected to each securing element a cam element 25 pivoted in the enclosing member 16 on transverse pivot pins 26. These cam elements are connected to the securing elements by a pivot 27 and each have a pair of cam surfaces 28 and 29 which cooperate with the cam block 30 mounted on an operating member 31, and if desired, there may be shoulders 32 and 33 at the outer ends of these cam surfaces to limit movements of the cam blocks. The operating member 31 is preferably of substantially U shape in cross section as shown in Fig. 4 so as to fit the interior of the enclosing member 16 and is guided for relative turning movements in the enclosing member. Its movements in opposite directions may be limited by studs 34 secured to the casing or enclosing member 16 and which have reduced necks 35 in the elongated slots 36. The end of this stud may be riveted over at 37 to assist in securing the plate 19 in position, or if desired, screws may be used for this purpose. It will be evident that as the operating member 31 is shifted in opposite directions, the cam blocks 30 will engage the cam surfaces 28 and 29 to swing the cam member 25 on its pivot 26 and shift the securing elements 21 toward and from the securing position.

Means are provided for shifting the operating member 31 in one direction automatically as soon as it is unlocked, and manual means are provided for shifting it in the opposite direction. In the drawing, one or more springs 38 are provided for shifting it in one direction. In the present instance the springs shift it in the direction to retract the securing elements 21 to release the tire rim altho, of course, the construction could be reversed so that the springs could be used to shift the operating member in the opposite direction to force the securing elements 21 outwardly to the securing position. The springs 38 are each secured at one end 39 to the stationary casing or enclosing member 16 and at its other end 40 to the operating member 31. Manual means is provided for shifting the operating member 31 in the opposite direction, in the present instance in the direction to force the securing elements 21 outwardly to clamp the rim in position. As shown, these elements comprise handles 41 secured to the inner flange 42 of the operating member 31 by any suitable means such as screws 43. There may be provided any desired number of these handles, but it is preferred to provide four of them, as shown, arranged in pairs on diametrically opposite sides of the wheel so that they will always be in position to be easily grasped and operated by the operator. These handles project through elongated slots 44 in the wall 45 of the enclosing member 16 and pass through an opening in a thin spring plate 46 of sufficient size to cover the slot 44 at all times and effectively close it against water and dirt. The body of the handle may have flanges 47 resting on top of the plate 46 to hold it in position.

Figure 5:
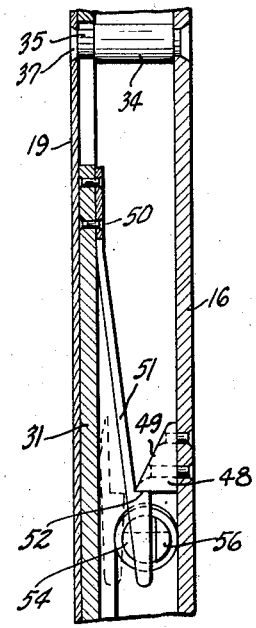
Fig. 5 is a detailed section showing the locking mechanism, the section being substantially on line 5—5 of Fig. 1, but on an enlarged scale.

The operating member 31 is locked in position with the securing elements 21 in extended position and clamped against the rim 13 by means of an automatically catching spring lock shown more clearly in Figs. 1 and 5. Secured to the member 16 on the inner wall thereof is a block 48 having an inclined top wall 49. Secured to the wall of the member 31 as by rivets 50 is a spring catch 51 having a shoulder 52 to engage over the block 48 as shown in Fig. 5 and lock the operating member 31 in a position in which the securing elements 21 are held extended to clamp the rim 13, which is the position shown in Figs. 1, 2 and 3. A key operated means is provided for releasing this spring lock. For this purpose, there is mounted in the inner wall 45 of the casing 16 a casing 53 for the usual type of tumbler pin lock commonly known as the Yale lock, which includes a rotary barrel 54, the operations of which are controlled by pin tumblers, not shown. The outer end in which is the key slot is closed by pivoted cover 55 which prevents entrance of dirt into the key hole slot. On the rotary barrel 54 is a cam 56 normally lying under the end of the catch 51 as shown in Fig. 5. It will be evident, however, that by turning the barrel 54 by means of the proper key cam 56 will be rotated to engage under the catch 51 and raise the shoulder 52 from engagement with the block 48 as shown in Fig. 5 in dotted lines. This will release the operating member 31 and permit the springs 38 to shift it clockwise as viewed in Fig. 1. This movement of the operating member 31 will carry the cam blocks 30 into engagement with the cam surfaces 29 to thereby swing the cam member 25 counter clockwise as viewed in Fig. 3 to the dotted line position and shift the holding and securing elements 21 inwardly away from the rim 13 to thus release it. The rim and the tire may now be drawn forwardly off the wheel in the usual manner.

To clamp the tire rim in position, it is merely slid back onto the felly and then the operator by grasping any one or a pair of the handles 41 can shift the operating member 31 in the opposite direction or counter clockwise as viewed in Fig. 1 to bring the elements into the position shown in this figure. This movement shifts the cam blocks 30 against the cam surfaces 28 on the cam members 25 to shift them clockwise about their pivots 26 as viewed in Fig. 3. This movement will force the securing elements 21 outwardly to engage the surface of the rim 13 and clamp it in position against the flange 15. This movement of the operating member 31 is against the tension of the springs 38 and it carries the spring catch 51 over the block 48 so that it assumes the position of Fig. 5 and automatically holds the operating member 31 with the securing elements 21 in extended or clamping position until the catch is again released by the key operated lock. It will thus be seen that to release the rim all that is necessary is to turn the lock barrel 54 by means of the proper key when the securing elements 21 are automatically retracted by the springs 38, and to lock the rim in position all that is necessary is to shift the member 31 in the opposite direction by means of the manual means 41 until the catch 51 rides over and engages the block 48. During this latter operation, the wheel is held from turning in the rim by the cross bolt secured in the felly and seating in a notch 8 in a channel member 7 mounted on the inside of the rim 13.

In order to compensate for variations in the various elements and to insure that all the securing elements 21 are properly clamped against the rim, it is preferred to make these elements so that the force for the clamping action is applied through a relatively heavy spring. A construction which may be used for this purpose is shown more clearly in Fig. 3. According to this construction, the cam surface 22 is carried by an outer member 57 which is slidable in the straps 23 and an inner member 58 extends into this outer member and is connected therewith for limited relative movement. For this purpose there is a cross pin 59 carried by the member 57 between two stop shoulders 60 on the inner member 58, and the spring 61 pressing at its opposite ends against the two members 57 and 58 tend to separate them. The inner member 58 is pivoted to the cam member 25 at 27. Thus, when the member 25 is forced to the position of Fig. 3 by the cam block 30, the outer member 57 is forced outwardly by the action of spring 61 and therefore, the member 57 is clamped against the rim 13 by action of this relatively heavy spring. Thus, irregularities in the elements are automatically compensated for and each and every one of the members 57 of the securing elements 21 are properly clamped against the rim and it is securely clamped at all points. If there were a rigid connection only between the elements 21 and cams 25, under certain conditions some of the elements 21 might not properly engage the rim with the result that the rim might be loose on the felly. Such condition is obviated with the construction shown.

It is also desirable that the wheel be removable as a whole from its axle and the same type of device may be used for securing it on this axle and permitting its easy removal. The wheel shown in Figs. 1 and 2 is a front wheel mounted on the axle 62 on which it rotates on the usual ball or roller bearings 63. One only of these bearings is shown, but there is another similar bearing at the other end of the hub. Secured to the tube 64 of the hub is an enclosing member 65 corresponding to the enclosing member 16 of the tire rim securing device. Pivoted on this enclosing member are the cam members 66 similar to the cam members 25 and they are pivoted to the enclosing member 65 at 67. The member 65 has a circular flange 68 and mounted to turn in this flange is the operating member 69 carrying cam blocks 70 corresponding to the cam blocks 30 of the form for the tire. Springs 71 corresponding to the springs 38 are connected at one end 72 to the operating member 69 and at their opposite ends 73 to the enclosing member or casing 65, and tend to rotate the member 69 counter clockwise as viewed in Fig. 1. Mounted to slide radially in the hub 64 are the securing elements 74 corresponding to the securing elements 21, and they are each pivoted to one of the cams 56 as indicated at 75. These elements 74 retain the wheel on the axle by seating at inner ends in an angular groove 76 in the axle, and to facilitate application of the wheel to the axle the end of the axle may be rounded somewhat as shown in 77. The elements are shown in Fig. 1 in the locking position. To secure the wheel on the axle the members 74 and operating member 69 are held in this position by a spring catch 78 similar to the catch 51 secured to the operating member 69 at 79 and having a shoulder 80 adapted to engage a block 81 on the stationary member 65. A key controlled barrel 82 is mounted in the casing 83 mounted in the flange 68 and has a cam 84 adapted to engage under the catch 78 and lift the shoulder 80 away from the block 81 to release the operating member 69, the same as is the catch 51 released to release the tire rim. The key hole slot in this locking device is also closed by a pivoted cover 85 to prevent entrance of dirt.

Thus, to release the wheel all the operator has to do is to insert a key in the pin tumbler controlled barrel 82 and rotate it. This will cause cam lug 84 to lift the catch 78 from the block 81 and release member 69 which is then automatically shifted counter clockwise as viewed in Fig. 1. Movement of the operating member 69 carries with it the cam block 70 which engages the cam surfaces 86 on the cam members 66 to shift them about their pivots and shift the securing elements outwardly out of the grooves 76 in the axle. The wheel may be then removed by merely pulling it outwardly off the axle. In again securing the wheel on the axle, all that is necessary is to again place it back on the axle and shift the operating member 69 in the opposite direction or clockwise as viewed in Fig. 1. This is also done by a manually operated means comprising a wrench 87 having a hooked end 88 adapted to be inserted in an opening 89 in the side wall or flange of the operating member 69. Then by merely forcing the wrench 87 in the clockwise direction, the operating member 69 is turned or shifted in the clockwise direction as viewed in Fig. 1 which shifts the cam blocks 70 into engagement with the cam surfaces 90 and forces the ends of the securing elements 74 into the groove 76 in the axle. This movement is against the action of the springs 71, and at the end of the movement the catch 78 automatically engages over the block 81 and locks the device in this position. The flange 68 is provided with an elongated slot 91 in alignment with the opening 89 to permit of insertion of a hook 88. Thus, it will be seen that the same locking means is used for locking the wheel to the axle as is used for locking the tire rim to the felly. Also that the wheel is released in the same manner by merely turning a key controlled element which releases the operating member 69 to permit the springs 71 to automatically unlock the wheel, and the wheel may again be locked by means of the manually operable means 87.

Figures 7, 8:
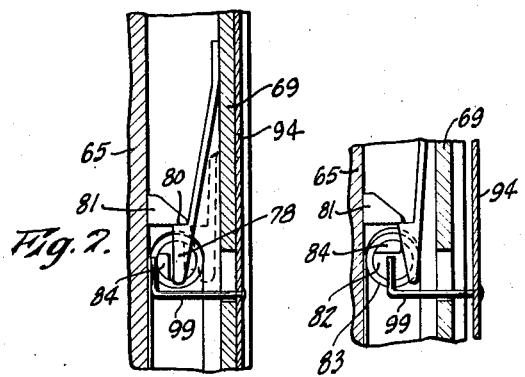
Figs. 7 and 8 are detailed sections of locking means for the hub construction.
Figure 6:
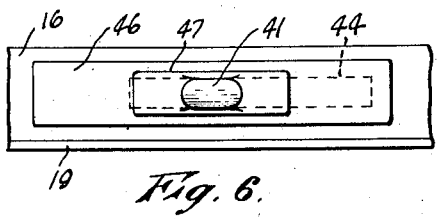
Fig. 6 is an end elevation of one of the manual operating means.

The stationary member 65 is threaded onto the hub tube 64 as indicated at 92. To prevent an unauthorized person from unscrewing this member it may be held by keys or screws 93. The operating member 69 is retained in position by a cover or plate 94 hinged to the flange 68 at 95, and the whole thing may be covered by a finishing cap 96 threaded onto the flange 68. However, to prevent an unauthorized person from gaining access to the locking mechanism by removing the cap 96, the cover 94 is locked by the same key controlled means that locks the wheel to the axle. Thus, as shown in Figs. 7 and 8, a hook 99 secured to the cover 94 extends under the key controlled cam 84 when the elements are in the locking position of Fig. 7 to lock the wheel to the axle, and thus the cam 84 cooperating with the hook 99 prevents raising of the cover 94 to expose the wheel securing mechanism. However, when the cam 84 is turned by the key to release the catch 78 and thus the wheel, this cam passes away from the hook 99 as shown in Fig. 8 and unlocks the cover 94. Altho, this means for securing the wheel to the axle is shown on the front wheel, the same thing may be used for the rear wheel except that in this case, the bearings 93 will be omitted as the rear wheel does not turn on the axle, and the hub of the wheel will be tapered and will fit on the tapered portion of the rear axle in the usual manner, which axle will have the groove 76 to receive the securing elements 74.

It is intended that both of these devices will be used on a wheel as shown so that the operator may remove either the wheel and change it or he may remove the tire and rim as desired. The use of the two is especially desired because with them the wheel may be quickly and easily removed and then the tire and rim may be as easily and quickly removed from the wheel and the tire changed. Or, if preferred, only one of these devices may be used on the wheel. Some car owners may prefer to remove the wheel as a whole and others may prefer to remove the tire and rim, but both these securing devices operate in the same way.

Figure 9:
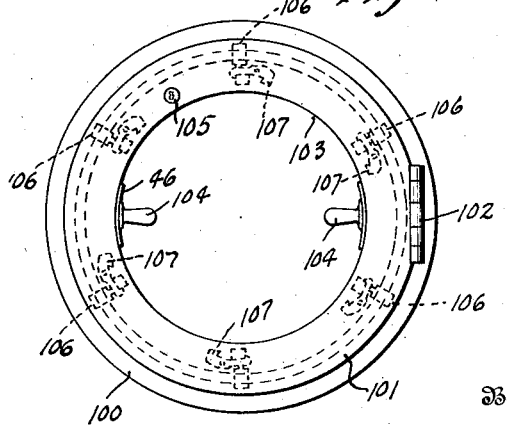
Fig. 9 is a diagrammatical view showing how the device may be used for securing other elements than automobile rims or wheels.

As indicated above, this locking device is not limited to use on automobile wheels, but may be used for locking safe doors, fire hose connections, hatch covers for submarines or similar devices. In Fig. 9 is shown diagrammatically how it may be applied for example to a round wall safe, the body of the safe being indicated at 100 and the door at 101 hinged at 102. The securing device is mounted in the door which may be depressed somewhat in the front wall as indicated at 103, in the side wall of which are mounted the handles 104 corresponding to the handles 41. The key controlled lock is indicated at 105 and this locking device contains the same elements as is used for locking the tire rim to the felly or the wheel to the axle. As indicated in dotted lines, the securing elements 106 are carried by the door and are shifted outwardly to engage in suitable recesses in the wall of the safe. These elements 106 correspond to the holding elements 21 and are operated by the cams 107 in the same manner as indicated in connection with the tire rim.

Having thus described the invention, what is claimed is:

1. In a locking device of the character described for securing together two separable elements, a stationary enclosing member carried by one of said elements, a plurality of securing elements associated with the stationary member and movable to and from securing relation with the other element, an operating member mounted for turning movements in the stationary member, cooperating cam elements connected with the operating member and the securing elements to shift said elements by movements of said operating member, means for locking the operating member in one position, means to shift said operating member to another position when the lock is released, and manual means for shifting the operating member to the first position.

2. In a locking device of the character described for securing together two separable elements, a stationary enclosing member connected with one of said elements, a plurality of radially movable securing elements associated with the stationary member and movable to and from securing relation with the other element, an operating member mounted for turning movements in the stationary member, a cam connected with each securing member, a cam member on the operating element cooperating with each of the first mentioned cams to shift said securing elements by movements of the operating member, means for locking the operating member in one position, a spring to shift said operating member when the lock is released, and manual means for shifting the operating member in the opposite direction.

3. In a locking device of the character described for securing together two separable elements, a plurality of securing members, carried by one of the elements and movable to and from securing relation with the other element, an operating member mounted for turning movements on the first element, means operated by movements of the operating member for shifting the securing members, means for locking the operating member in one position, a spring for shifting said operating member when the lock is released, and manual means for shifting the operating member in the opposite direction.

4. In a locking device of the character described, for securing together two separable elements, a plurality of radially movable securing members carried by one of the elements and movable to and from securing relation with the other element, an operating member mounted for turning movements on the first element, cooperating cam elements connected with the operating member and the securing members for shifting the latter members by movement of the operating member, means for locking the operating member in one position, means for automatically shifting the operating member on release of the locking means, and manual means for shifting the operating member in the opposite direction.

5. In a locking device of the character described for securing together two separable elements, a plurality of radially movable securing members carried by one of the elements and movable to and from securing relation with the other element, an operating member mounted for turning movements on the first element, a pivoted cam member connected to each securing member and provided with a cam surface on opposite sides of its pivot, a cam block on the operating member between the cams of each cam member to alternately cooperate therewith on movement of the operating member, means for shifting the operating member in opposite directions, and means for locking the operating member in a given position.

6. In a device for locking an automobile tire rim to the wheel, an enclosing member secured to the wheel, securing members associated with the enclosing member and movable to and from securing position for the tire rim, an annular operating member mounted for turning movements in the enclosing member, means operated by movements of the operating member for shifting the securing members to and from holding position, means for locking the operating member in one position, means for shifting said latter member when the lock is released, and manual means for shifting the operating member in the opposite direction.

7. In a device for locking an automobile tire rim to the wheel, an enclosing member secured to the wheel, radially movable securing members carried by the wheel adapted to engage one side of the rim to clamp the rim on the wheel, an annular operating member mounted for sliding movements in the enclosing member, an operative connection from the operating member to each securing member, means for locking the operating member with the securing members in holding position, means for automatically shifting the operating member to release the rim when the lock is released, and manual means for shifting the operating member in the opposite direction to lock the rim in position.

8. In a device for locking an automobile tire rim to the wheel, an enclosing member secured to the wheel, radially movable securing members carried by the wheel comprising relatively movable elements one of which is adapted to engage the rim with a camming action to clamp the rim to the wheel and a spring between said elements tending to separate them, an operating member mounted on the wheel, an operative connection between the operating member and the second of said elements and means for shifting the operating member.

9. In a device for locking an automobile tire rim to the wheel, comprising a plurality of radially movable securing members carried by the wheel each comprising two relatively movable elements with a compression spring between them, one of said elements having a camming surface to engage the side of the rim and clamp it to the wheel, a movable operating member, an operating means between the operating member and the second element of each securing member and means for shifting the operating member to clamp and release the rim.

10. In a device for locking an automobile tire rim to a wheel, the combination with the wheel and rim of a plurality of radially movable securing devices carried by the wheel each comprising two members connected for limited relative movement and a spring tending to separate them, the outer member and the rim being provided with cooperating cam surfaces to clamp the rim to the wheel, a movable operating member on the wheel, an operative connection from the operating member to the inner member of each of the securing devices, and means for shifting the operating member to clamp and release the rim.

11. In a device for locking an automobile tire rim to a wheel, an enclosing member secured to the wheel, radially movable securing members carried by the wheel and adapted to clamp the rim to the wheel, an annular operating member in the enclosing member mounted for turning movements therein, cooperating cam elements connected with the operating member and the securing members to shift the securing members by turning movements of the operating member, means for locking the operating member in position to hold the securing members in holding position, a spring tending to shift the operating member to releasing position, and manual means for shifting the operating member to securing position.

12. In a device for locking an automobile tire rim to a wheel, an enclosing member secured to the wheel, radially movable securing members carried by the wheel and adapted to clamp the rim to the wheel, an operating member mounted for turning movements in the enclosing member, cam elements pivotally mounted in the enclosing member and connected with the securing members, each cam element having a cam surface on each side of its pivot, cam blocks carried by the operating member to engage said cam surfaces to shift the securing elements in opposite directions, a spring tending to shift the operating member in one direction, a key controlled catch to hold the operating member against movement by said springs, and manual means for shifting the operating member in the opposite direction.

13. In a device for locking an automobile tire rim to a wheel, an enclosing casing substantially U-shape in cross section so as to be open at its rear side, said casing having a flange by which it is secured to the wheel, a plate enclosing the rear side of the casing, radially movable securing elements adapted to engage the front of the rim and clamp it in position on the felly, an annular operating member mounted for turning movements in the casing, operative connections between the operating member and the securing elements, means for shifting the operating member in opposite directions, and means for locking the securing elements in rim holding position.

14. In a device for locking an automobile tire rim to a wheel, radially movable securing elements adapted to engage the outer side of the rim and clamp it on the wheel, a pivoted cam member connected to each securing element and having cam surfaces, a movable operating member, means for shifting the operating member in opposite directions, means carried by the operating member to engage said cam surfaces to shift the securing elements in opposite directions, and means for locking the operating member in position to hold the securing elements in clamping position.

In testimony whereof I affix my signature.

CASIMIRO FERRO.